Patented Feb. 28, 1939

2,148,893

UNITED STATES PATENT OFFICE 2,148,893

PROCESS FOR PREPARING TANNING AGENTS

Rudolf Bauer, Leverkusen I. G. Werk, Germany, assignor to I. G. Farbenindustrie Aktiengesellschaft, Frankfort-on-the-Main, Germany No Drawing. Application August 13, 1937, Serial No. 158,966. In Germany August 22, 1936

10 Claims. (Cl. 149—5)

The present invention relates to a process of preparing tanning agents from lignin sulfonic acid, especially sulfite cellulose waste liquor, simple aromatic hydroxy compounds and aldehydes.

Several proposals have been made of preparing tanning agents from the above components in one working step, however, no practically valuable products meeting the requirements of present day tanning have been obtained hitherto in this way. A solution of these difficulties was sought in the direction of performing the synthesis of such tanning agents from sulfite cellulose waste liquor in several different steps, for instance by first condensing the aromatic hydroxy compound with the aldehyde and treating sulfite cellulose waste liquor with such condensation products. Obviously, there still remained the problem of simplifying the manufacture of the said synthetic tanning agents from lignin sulfonic acid, especially the cellulose waste liquor containing soluble salts thereof.

It is an object of my invention to provide such a simple method which will render it possible to prepare water-soluble tanning agents of high quality in one operation from lignin sulfonic acid or the salts thereof, simple, i. e., uncondensed, aromatic hydroxy compounds and aldehydes. This and other objects which will be more fully apparent from the following description of my invention I attain by causing the simple aromatic hydroxy compound and a suitable aldehyde which is capable of linking aromatic nuclei, to act on lignin sulfonic acid under mild conditions so that on the one hand the aromatic hydroxy compound will be consumed to as far a degree as possible, and on the other hand no insoluble compounds are formed. I have found that it is necessary to this end to establish a suitable "acid value" in the reaction mixture, the acid value being defined in the following description and claims as the amount (in c. c.) of a normal sodium hydroxide solution being necessary in order to neutralize 10 g. of the reaction mixture. The acid value so defined according to my findings should be not less than about 10 and preferably, especially when sulfite cellulose waste liquor is used as a starting material, should be near the value of 20 in order to obtain the desired products in the best possible yield and quality. The said suitable acidity may be established, for instance, by adding the required amount of a mineral acid or a strong organic acid to the reaction mixture. It is also possible not to start from a salt of lignin sulfonic acid as in the case of sulfite cellulose waste liquor, but to use the free lignin sulfonic acid which may have been isolated from sulfite cellulose waste liquor as described below. In this case the lignin sulfonic acid solution is concentrated until the desired acid value is reached or, when more dilute solutions are employed, a suitable amount of another acid is added.

As regards the further conditions of working, e. g., concentration, temperature, time, etc., they may vary within certain limits, but in any case they are to be so chosen that the products do not become too highly condensed and are still watersoluble. For example, if the acid value of the reaction mixture is relatively high, the temperature should not exceed about 50° C., whereas on working near the lower limit of the acid value it may be raised up to about 70° C. or for a short time even up to the boiling point. In any case the reaction is terminated when the simple aromatic hydroxy compound has been consumed and before insoluble products begin to be formed.

As starting material for the present invention there may be mentioned in the first place the salts of lignin sulfonic acid as are contained in or can be prepared from sulfite cellulose waste liquor. The sulfite cellulose waste liquor may have originated, for instance, from the sulfite process for preparing cellulose from beech-wood or pine wood. It is also possible to isolate therefrom the lignin sulfonic acid, for instance by treating the sulfite liquor (containing considerable amounts of calcium salts) with an acid forming an insoluble calcium salt, for instance sulfuric acid or oxalic acid. The lignin sulfonic acid solution is separated from the precipitated salt and may be used as starting material for the present process after concentration or adding a suitable amount of acid.

As acids which may be used for establishing the required acid value I may mention for example sulfuric acid, hydrochloric acid, phosphoric acid, formic acid, trichloracetic acid, para-toluene sulfonic acid, etc.; I may also use products which are splitting off an acid in the reaction mixture as, for instance, phosphoroxychloride.

As stated above it is a special advantage of my present process that it allows the preparation of valuable tanning agents from simple uncondensed aromatic hydroxy compounds thereby avoiding the previous preparation of condensation products thereof. I may add that in distinction from known processes it is possible according to my invention to incorporate much higher quantities of the aromatic hydroxy compound with sulfite cellulose waste liquor while thus obtaining valuable watersoluble products. The relative proportion of aromatic hydroxy compound and lignin sulfonic acid in the products of my present invention may go for instance up to 1:2. As examples of simple uncondensed aromatic hydroxy compounds there may be mentioned phenol, its homologues, analogues and substitution products like chlorophenol, the cresols, xylenols, resorcinol, naphthols, phenol sulfonic acids, salicylic acid etc.

As a further reaction component I use an aldehyde of the group which is capable of linking aromatic nuclei as for instance formaldehyde, substances yielding formaldehyde, acetaldehyde, benzaldehyde, croton aldehyde, furfur aldehyde and the like.

The products which are obtained in the manner outlined above and the preparation of which is furthermore illustrated by the following examples can be separated from the reaction mixture in solid form. They are well soluble in water and have a tanning action which is similar to that of vegetable tanning extracts, i. e., they yield when used alone soft and full leathers.

In the following examples the parts are by weight:

Example 1

50 parts aqueous hydrochloric acid (19.5° Bé.) are added to 120 parts sulfite cellulose waste liquor (35° Bé.), 15 parts cresol (D. A. B. IV) and 10 parts acetaldehyde. The acid value of the mixture is about 21.5. After stirring for several hours a solid product separates from the mixture. The aqueous acid is removed and the product is dissolved in aqueous ammonia to a syrupy solution which on dilution may be used for tanning and will yield a well filled leather of light-brown color.

Example 2

To a mixture of 120 parts sulfite cellulose waste liquor (35° Bé.), 12 parts phenol and 15 parts aqueous formaldehyde solution (30%) there are added at 30° C. 20 parts phosphoroxychloride. The mixture is stirred until the phosphoroxychloride has disappeared and the solid reaction product precipitates. It is separated from the acid solution and dissolved in aqueous ammonia to form a highly viscous solution which on tanning will yield a light and well filled leather.

Example 3

To a mixture of 120 parts sulfite cellulose waste liquor (35° Bé.), 10 parts phenol and 6 parts aqueous formaldehyde solution (30%) there are added 20 parts 78% sulfuric acid at 25°. The acid value of the mixture is about 20. The mixture is stirred until the reaction product separates which is then dissolved in water. By adding ammonia the desired pH value of the solution is established which may then be used for tanning, yielding a light and well filled leather.

Example 4

To a mixture of 120 parts sulfite cellulose waste liquor (35° Bé.), 13 parts ortho-chlorophenol and 10 parts aqueous formaldehyde solution (30%) there are added at 40° C. 40 parts aqueous hydrochloric acid (19.5° Bé.). After about 4 hours a solid reaction product has been formed. It is separated from the aqueous acid and dissolved in aqueous ammonia. On establishing a suitable concentration and pH value, the solution has a good tanning effect.

Example 5

1200 parts sulfite cellulose waste liquor from beech-wood (33° Bé.) are mixed with 200 parts 78% sulfuric acid. 87 parts phenol and 90 parts aqueous formaldehyde solution (30%) are added and the mixture is slowly warmed to 50° C. while stirring. On adding 50 parts ammonium sulfate the reaction product is precipitated in solid form. After separating from the aqueous acid it is dissolved with the aid of aqueous ammonia to a syrupy mass which on dilution may be used as a tanning agent and will yield soft and well filled leathers.

Example 6

To a mixture of 120 parts sulfite cellulose waste liquor (35° Bé.) and 70 parts 48% sulfuric acid there is added at 45–50° C. a solution of 12 parts phenol in 15 parts aqueous formaldehyde (30%). After stirring for several hours the solid reaction product is separated from the aqueous acid and dissolved with the aid of aqueous ammonia. The solution has an excellent tanning action.

Example 7

1000 parts sulfite cellulose waste liquor from beech-wood (10° Bé.) which has not been freed from calcium salts are boiled with 20 parts oxalic acid, filtered from the calcium oxalate and concentrated in vacuo to 32° Bé. The acid value of this solution is about 18. 600 parts thereof are mixed with 45 parts phenol and 55 parts 30% formaldehyde solution and, without adding a further condensing agent, are warmed to 50° C. for 5 hours. Thereupon a pH of 4 is established by adding ammonia and acetic acid. After suitable dilution with water the solution may be used directly for tanning and will yield strong leathers.

Example 8

1000 parts sulfite cellulose waste liquor (50%) from pine-wood which has not been freed from calcium salts are stirred with 80 parts sulfuric acid (60° Bé.) at 70° C. and filtered from the calcium sulfate. The resulting solution of free lignin sulfonic acid having an acid value of 14 is treated at 40° C. for 5 hours with 64 parts phenol and 77 parts 30% aqueous formaldehyde. The mixture is neutralized with the aid of aqueous ammonia and a pH of 4 is established by adding acetic acid. The resulting syrupy mass easily dissolves in water and on tanning yields a strong light leather.

Example 9

500 parts of a lignin sulfonic acid solution having been prepared according to Example 7 and having an acid value of about 19 are warmed with 60 parts resorcinol. After the latter has been dissolved the solution is cooled to 35° C. and 20 parts benzaldehyde are added. After stirring for 5 hours at 35° C. the reaction product is brought to a pH of 4 by adding ammonia and acetic acid. An easily soluble syrup is obtained which on tanning yields a soft and well filled leather resembling leathers which have been prepared with the aid of vegetable tanning extracts.

I claim:

1. A process for preparing tanning agents from lignin sulfonic acid which comprises treating a solution of a compound selected from the group consisting of lignin sulfonic acid and the soluble salts thereof with a simple aromatic hydroxy compound and an aldehyde being capable of linking aromatic nuclei, the acid value of the mixture being at least about 10, and terminating the treatment when the aromatic hydroxy compound has been practically consumed and before insoluble compounds begin to be formed.

2. A process for preparing tanning agents from lignin sulfonic acid which comprises treating an aqueous solution of a compound selected from the group consisting of lignin sulfonic acid and the soluble salts thereof with a simple aromatic hydroxy compound and an aldehyde being capable of linking aromatic nuclei, the acid value of the mixture being at least about 10, and terminating the treatment when the aromatic hydroxy compound has been practically consumed and before insoluble compounds begin to be formed.

3. A process for preparing tanning agents from lignin sulfonic acid which comprises treating an aqueous solution of a compound selected from the group consisting of lignin sulfonic acid and the soluble salts thereof with a phenol and formaldehyde, the acid value of the mixture being at least about 10, and terminating the treatment when the phenol has been practically consumed and before insoluble compounds begin to be formed.

4. A process for preparing tanning agents from lignin sulfonic acid which comprises treating sulfite cellulose waste liquor with a simple aromatic hydroxy compound and an aldehyde being capable of linking aromatic nuclei, the acid value of the mixture being at least about 10, and terminating the treatment when the aromatic hydroxy compound has been practically consumed and before insoluble compounds begin to be formed.

5. A process for preparing tanning agents from lignin sulfonic acid which comprises treating sulfite cellulose waste liquor with a simple aromatic hydroxy compound and an aldehyde being capable of linking aromatic nuclei, the acid value of the mixture being about 20, and terminating the treatment when the aromatic hydroxy compound has been practically consumed and before insoluble compounds begin to be formed.

6. A process for preparing tanning agents from lignin sulfonic acid which comprises treating sulfite cellulose waste liquor with a phenol and formaldehyde, the acid value of the mixture being about 20, and terminating the treatment when the phenol has been practically consumed and before insoluble compounds begin to be formed.

7. A process for preparing tanning agents from lignin sulfonic acid which comprises treating sulfite cellulose waste liquor with a phenol and formaldehyde at temperatures which substantially do not exceed about 50° C., the acid value of the mixture being about 20, and terminating the treatment when the phenol has been practically consumed and before insoluble compounds begin to be formed.

8. A process for preparing tanning agents from lignin sulfonic acid which comprises treating an aqueous solution of lignin sulfonic acid having an acid value of at least about 10 with a simple aromatic hydroxy compound and an aldehyde being capable of linking aromatic nuclei and terminating the treatment when the aromatic hydroxy compound has been practically consumed and before insoluble compounds begin to be formed.

9. A process for preparing tanning agents from lignin sulfonic acid which comprises treating an aqueous solution of lignin sulfonic acid having an acid value of about 20 with a phenol and formaldehyde and terminating the treatment when the phenol has been practically consumed and before insoluble compounds begin to be formed.

10. A process for preparing tanning agents from lignin sulfonic acid which comprises treating an aqueous solution of lignin sulfonic acid having an acid value of about 20 with a phenol and formaldehyde at temperatures which substantially do not exceed about 50° C., and terminating the treatment when the phenol has been practically consumed and before insoluble compounds begin to be formed.

RUDOLF BAUER.